(12) United States Patent
Pathak

(10) Patent No.: US 9,008,455 B1
(45) Date of Patent: Apr. 14, 2015

(54) ADAPTIVE MPEG NOISE REDUCER

(75) Inventor: Bharat Pathak, Bangalore (IN)

(73) Assignee: Marvell International Ltd., Hamilton (BM)

( * ) Notice: Subject to any disclaimer, the term of this patent is extended or adjusted under 35 U.S.C. 154(b) by 41 days.

(21) Appl. No.: 13/460,152

(22) Filed: Apr. 30, 2012

Related U.S. Application Data

(62) Division of application No. 11/521,927, filed on Sep. 14, 2006, now Pat. No. 8,175,405.

(51) Int. Cl.
*G06K 9/00* (2006.01)
*H04N 19/117* (2014.01)

(52) U.S. Cl.
CPC .................... *H04N 19/117* (2013.01)

(58) Field of Classification Search
USPC .................................................. 382/232–253
See application file for complete search history.

(56) References Cited

U.S. PATENT DOCUMENTS

| | | | |
|---|---|---|---|
| 5,565,921 A * | 10/1996 | Sasaki et al. | 375/240.13 |
| 5,852,475 A * | 12/1998 | Gupta et al. | 348/606 |
| 6,539,060 B1 | 3/2003 | Lee et al. | |
| 7,373,012 B2 | 5/2008 | Avidan et al. | |
| 2002/0080882 A1 * | 6/2002 | Kitagawa | 375/240.29 |
| 2004/0095511 A1 | 5/2004 | Amara et al. | |
| 2004/0120597 A1 * | 6/2004 | Le Dinh | 382/261 |
| 2004/0126034 A1 | 7/2004 | Yu et al. | |
| 2004/0141557 A1 | 7/2004 | Lin et al. | |
| 2005/0243915 A1 | 11/2005 | Kwon et al. | |
| 2005/0244063 A1 | 11/2005 | Kwon et al. | |
| 2006/0098744 A1 | 5/2006 | Huang | |
| 2006/0133504 A1 | 6/2006 | Jung et al. | |
| 2010/0060749 A1 * | 3/2010 | Srinivasan et al. | 348/222.1 |

OTHER PUBLICATIONS

Fabrizio Russo, "A Method for Estimation and Filtering of Gaussian Noise in Images", *IEEE Transactions on Instrumentation and Measurement*, vol. 52, No. 4, pp. 1148-1154, Aug. 2003.
Sung Deuk Kim, et al "A Deblocking Filter with Two Separate Modes in Block-Based Video Coding", *IEEE Transactions on Circuits and Systems for Video Technology*, vol. 9, No. 1, pp. 156-160, Feb. 1999.

* cited by examiner

*Primary Examiner* — Alex Liew

(57) ABSTRACT

The disclosed technology provides a system and a method for adaptive MPEG noise reduction. In particular, the disclosed technology provides a system and a method for reducing blocking artifacts and mosquito noise in an MPEG video signal. An overall MPEG noise detector may be used to determine the presence of noise in one or more frames of a video signal. When a sufficient amount of noise is detected in the one or more frames of the video signal, portions of the video signal that contain noise may be located and filtered to reduce the amount of noise present in the video signal.

26 Claims, 13 Drawing Sheets

900

| X(1,1) | X(1,2) | X(1,3) | X(1,4) | X(1,5) |
|--------|--------|--------|--------|--------|
| X(2,1) | X(2,2) | X(2,3) | X(2,4) | X(2,5) |
| X(3,1) | X(3,2) | X(3,3) | X(3,4) | X(3,5) |
| X(4,1) | X(4,2) | X(4,3) | X(4,4) | X(4,5) |
| X(5,1) | X(5,2) | X(5,3) | X(5,4) | X(5,5) |

| 1210 | | | | 1220 | | | | 1230 | | | |
|---|---|---|---|---|---|---|---|---|---|---|---|
| A1 | B1 | C1 | D1 | A2 | B2 | C2 | D2 | A3 | B3 | C3 | D3 |
| E1 | F1 | G1 | H1 | E2 | F2 | G2 | H2 | E3 | F3 | G3 | H3 |
| I1 | J1 | U1 | L1 | I2 | J2 | U2 | L2 | I3 | J3 | U3 | L3 |
| M1 | N1 | O1 | P1 | M2 | N2 | O2 | P2 | M3 | N3 | O3 | P3 |

| Left Block | Middle Block | Right Block |

FIG. 12

ADAPTIVE MPEG NOISE REDUCER

CROSS-REFERENCE TO RELATED APPLICATION

This is a division of U.S. patent application Ser. No. 11/521,927, filed Sep. 14, 2006, now U.S. Pat. No. 8,175,405, which is hereby incorporated herein by reference in its entirety.

BACKGROUND OF THE INVENTION

This invention generally relates to signal processing applications. More particularly, the present invention relates to a system and method for an adaptive noise reducer for reducing MPEG noise in a digital video signal.

Video signals may be corrupted by many forms of noise that are attributable to multiple sources. One source of noise in video signals is the compression of the video signal.

When the video information is stored on a digital video disc (DVD) or other digital media it is typically stored in a compressed format. Ninety minutes of uncompressed standard-definition video stored in a uncompressed format (Y:Cb:Cr 4:2:2) will require approximately 90 gigabytes (GB) of storage space. Uncompressed high-definition video of the same length would require six times the amount of storage space, or 540 GB. However, typical DVD disks only have capacities of approximately 4.7 gigabytes. Therefore storing a full-length standard-definition movie on a single DVD disk requires the video to be compressed using a format having a compression ratio on the order of 20:1. For high-definition content, higher capacity disks are used with similar compression ratios (e.g., approximately 30 GB are required to store a full-length movie in Blu-Ray format). In order to stream high-quality video (e.g., over the Internet), compression ratios as high as 50:1 may be required (depending on channel bandwidth).

The MPEG formats are a set of standards established for the compression of digital video and audio data. Where predictive coding of motion pictures is used, as in MPEG-1, compression artifacts tend to remain on several generations of decompressed frames, leading to a "painting" effect being seen, as if the picture were being painted by an unseen artist's paint-brush. Where motion prediction is used, as in MPEG-2 or MPEG-4, compression artifacts tend to move with the optic flow of the image, leading to a peculiar effect, part way between a painting effect and "grime" that moves with objects in the scene. Errors in the bit-stream can lead to errors similar to large quantization errors, or can disrupt the parsing of the data stream entirely for a short time, leading to "break-up" of the picture. Where gross errors have occurred in the bit-stream, it is not uncommon for decoders to continue to apply "painting" updates to the damaged picture, creating "ghost image" effects.

To stop the build-up of compression artifacts, most compression systems occasionally send an entire compressed frame without prediction or differencing, usually at the start of a shot and at regular intervals thereafter. In MPEG picture coding, these are known as "I-frames", with the 'I' standing for "intraframe compression."

Various techniques have been used to attempt to address the noise that occurs in a digital video signal. With digital displays becoming bigger, it becomes even more important to remove noise. Larger displays will make the noise more readily discernable to a viewer of the video. Many of the techniques previously applied are incomplete, resulting in a video signal that has its noise effects only marginally improved.

SUMMARY OF THE INVENTION

In accordance with one aspect of the present invention a system and method for reducing MPEG noise in a digital video signal is provided.

In another aspect of the present invention a system and method for reducing blocking artifacts in an MPEG video signal is provided.

In another aspect of the present invention a system and method for reducing mosquito noise in an MPEG video signal is provided.

These and other aspects are accomplished in accordance with the principles of the present invention by providing an adaptive MPEG noise reducer. An overall MPEG noise detector may be used to determine the presence of noise in one or more frames of a video signal. When a sufficient amount of noise is detected in the one or more frames of the video signal, portions of the video signal that contain noise may be located and filtered to preferably reduce the amount of noise present in the video signal.

In some embodiments a method and system for detecting and removing blocking artifacts is provided. An overall blocking artifact detector may determine the number of blocking artifacts present in a frame of video. When a sufficient number of blocking artifacts are detected in a frame of video, a blocking artifact detection and removal system may be activated. In some embodiments, the results of the overall blocking artifact detector may be averaged over a number of frames in order to determine whether to activate or deactivate the blocking artifact detection and removal system.

When the blocking artifact detection and removal system is activated, the pixels of the video signal may be scanned to determine the presence of horizontal and vertical block boundaries within the video signals, which may be indicative of the presence of blocking artifacts. When horizontal and vertical block boundaries are detected one or more block boundary filters may be used to remove or reduce the presence of blocking artifacts within the video signal, preferably without adversely affecting the video quality. The particular block boundary filter selected may be customized in order to maximize the efficacy of the blocking artifact removal, based on the nature and locations of the blocking artifacts and the block boundaries.

In some embodiments a method and system for detecting and removing mosquito noise is provided. An overall mosquito noise detector may determine the amount of mosquito noise present in a frame of video. When a sufficient quantity of mosquito noise is detected in a frame of video, a mosquito noise detection and removal system may be activated. In some embodiments, the results of the overall mosquito noise detector may be averaged over a number of video frames in order to determine whether to activate or deactivate the mosquito noise detection and removal system.

When the mosquito noise detection and removal system is activated, the pixels of the video signal may be scanned to determine the presence of mosquito noise within the video signals. When mosquito noise is detected one or more mosquito noise filters may be used to remove or reduce the presence of mosquito noise within the video signal, preferably without adversely affecting the video quality. The particular mosquito noise filter selected may be customized in order to maximize the efficacy of the mosquito noise removal based on the nature and locations of the mosquito noise within the video frame.

Further features of the invention, its nature and various advantages, will be more apparent from the accompanying drawings and the following detailed description of the various embodiments.

BRIEF DESCRIPTION OF THE DRAWINGS

FIG. 9 is an illustrative diagram showing a 5×5 array of pixels that may be used to compute a graded edge map in accordance with one aspect of the invention.

FIG. 12 is an illustrative diagram showing three adjacent 4×4 blocks of pixels that may be used for overall mosquito noise detection in accordance with one aspect of the invention.

DETAILED DESCRIPTION

In accordance with one aspect of the present invention an MPEG noise reducer is provided to process a digital video signal in order to reduce the presence of MPEG compression noise related artifacts. The MPEG-2 format has become an industry standard in encoding/decoding of digital video. However, MPEG-2 compression is lossy in nature. A lossy data compression method is one where compressing data and then decompressing it results in data that may well be different from the original data, but is "close enough" to be useful in some way. One result of this lossy compression is noise that may be noticeable when playing back the compressed video. This noise may include blocking artifacts and mosquito noise.

Blocking artifacts appear as blocks that are typically eight pixels by eight lines in size. However, it should be understood that blocking artifacts may be of any suitable size based on the encoding standard. Commonly found block sizes are, for example, 8×8, 8×4, 4×8 and 4×4. These blocking artifacts are seen mostly in flat areas or areas with less detail. Such blocking artifacts are also more prominent when there is a sudden change in a scene within the video. These blocking artifacts occur when surrounding pixels in certain areas are averaged and together look like a single larger pixel that create the block look. The blocking artifacts also occur more frequently where higher compression ratios are used. In such cases, the DCT coefficient scaling and quantization used in the MPEG encoding/decoding process affects DC coefficients of the video signal. When adjacent blocks in homogenous regions of the video have differing DC coefficient levels, blocking artifacts become apparent.

Mosquito noise appears like some kind of edge ringing and is most visible along sharp edges in low energy areas. The ringing is due to the truncation of high frequency coefficients within the compressed video signal.

Typically two techniques are used to reduce MPEG artifacts. One technique is in-loop processing. This in-loop processing is done at the place where the MPEG data is decoded. With this type of processing, the encoded data is available and some of the loop parameters are known. As a result, in-loop noise reduction techniques are generally considered relatively more effective at reducing noise present in compressed video.

The other noise reduction technique is to perform post-processing. In post-processing approach little or no information is available about how the video was originally encoded. As a result, the only information that is available to remove the noise from the video signal is the video signal itself.

In accordance with one aspect of the present invention a post-processing approach is provided to remove blocking artifacts and mosquito noise from a video signal. Separate techniques, that may be used independently or together, will be provided to remove blocking artifacts and mosquito noise.

Figure 1:
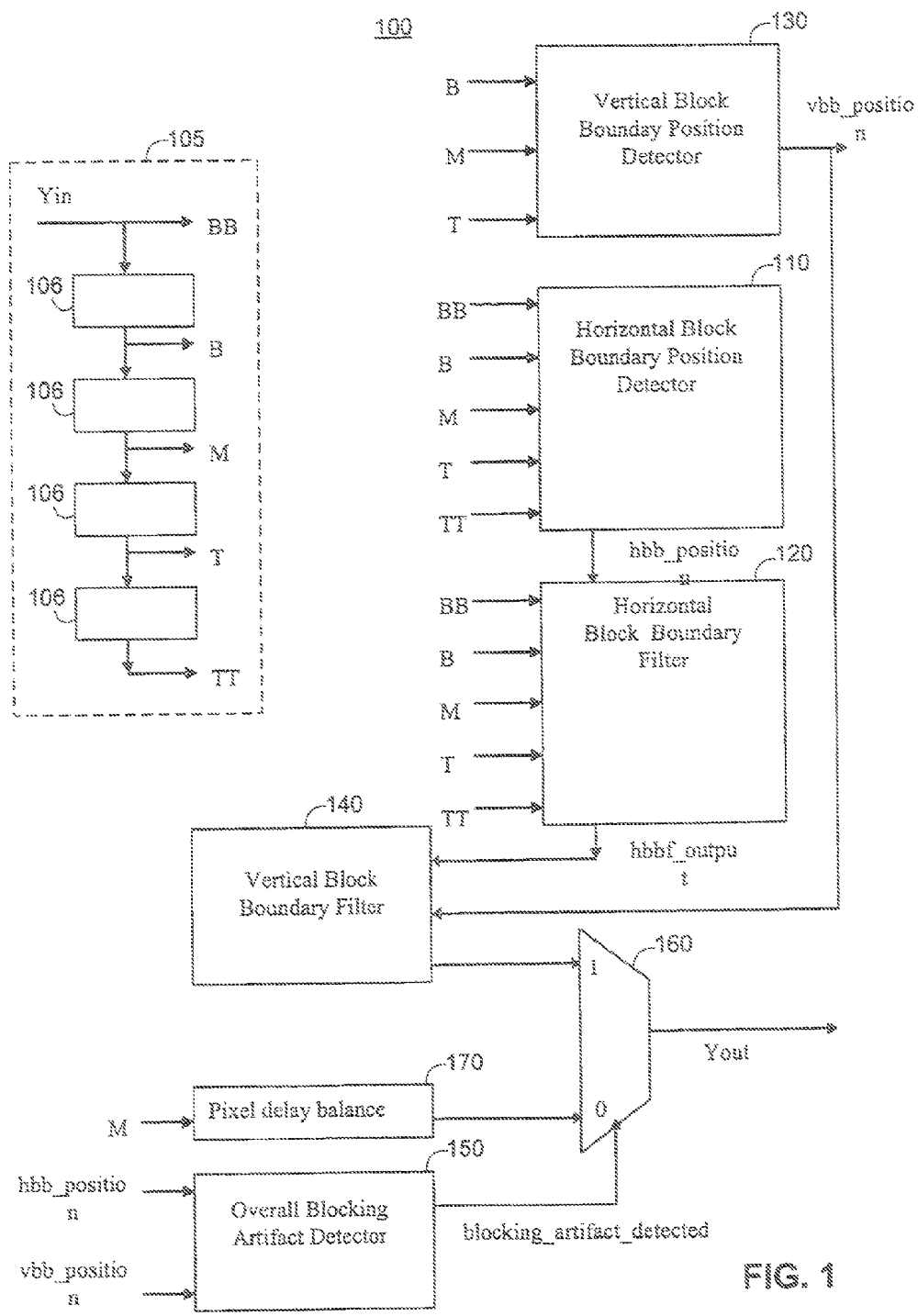
FIG. 1 is an illustrative block diagram of a blocking artifact detection and removal system in accordance with one aspect of the invention.

FIG. 1 is an illustrative block diagram of blocking artifact detection and removal system 100 that may be used to detect and remove blocking artifacts from a digital video signal. Blocking artifact detection and removal system 100 processes digital video in the YCbCr 4:2:2 domain. More particularly, in this embodiment blocking artifact detection and removal system 100 only processes the luminance channel (i.e., the "Y" channel) of the video signal. Because the human eye is more sensitive to luminance than color, it has been observed that effective noise reduction may be achieved by processing the luminance channel alone. However, it should be understood that the techniques provided herein for reducing noise in the luminance channel may also be applied to the chrominance channels. Further, in the embodiments described herein the noise reduction algorithms have been implemented in the progressive domain, but it should be understood that the same concepts may also be applied in the interlaced domain.

Before the video signal and in particular the luminance channel of the video signal are processed by blocking artifact detection and removal system 100 to detect and remove blocking artifacts, portions of the video signal are buffered. In particular, as each line of video is processed, information about one or more adjacent lines of video is obtained in order to detect blocking artifacts. In the present embodiment, buffer 105 is made up of four serially connected line buffers 106 in order to provide five consecutive lines of video. Each of these lines of video is made up of a fixed number of pixels, equal to the horizontal resolution of the video. For example, standard-definition video contain 720 pixels per line and high-definition video contain 1920 pixels per line. These five consecutive lines of video are labeled bottom-bottom (BB), bottom (B), middle (M), top (T), and top-top (TT). In this case, line M is the line currently being processed and may also be referred to herein as the line of interest. In other embodiments, other suitable buffering techniques may also be used. For example, additional line buffers or memories may be used to store additional lines or even entire frames of video. These line buffers may be implemented, for example, using on-chip single-port SRAM cells. In the present embodiment, for example, a single memory of 1024 words by 96 bits may be used.

Blocking artifact detection and removal system 100 contains five modules: horizontal block boundary position detector 110, horizontal block boundary filter 120, vertical block boundary position detector 130, vertical block boundary filter 140, and overall blocking artifact detector 150. These modules may be used together to remove or filter blocking artifacts from the video signal.

Horizontal block boundary position detector 110 and vertical block boundary position detector 130 detect horizontal and vertical block boundaries within the video signal, respectively. These horizontal and vertical block boundaries may be indicative of blocking artifacts within the video signal. Horizontal block boundary filter 120 receives the video signal input (i.e., the five consecutive lines of video: BB, B, M, T, TT) and provides a filtered video signal output (i.e., hbbf_output) to vertical block boundary filter 140. As will be described in greater detail below, horizontal block boundary filter 120 processes the video in a vertical direction and vertical block boundary filter 140 processes the video in a horizontal direction. When overall blocking artifact detector 150 determines that there are a sufficient number of blocking artifacts within a video signal, overall blocking artifact detector 150 signals multiplexer 160 to provide the output of vertical block boundary filter 140 as the output of blocking artifact detection and removal system 100. However, when overall blocking artifact detector 150 determines that a sufficient number of blocking artifacts are not present within a video signal, overall blocking artifact detector 150 signals multiplexer 160 to provide line of interest M to the output of blocking artifact detection and removal system 100 delayed by pixel delay balance 170. Pixel delay balance 170 delays the input video signal to approximate the delay of the blocking artifact filtered signal path, such that switching multiplexer 160 will not interrupt the output of blocking artifact detection and removal system 100. The operation of these modules of blocking artifact detection and removal system 100 will be discussed in greater detail below.

Figure 2:
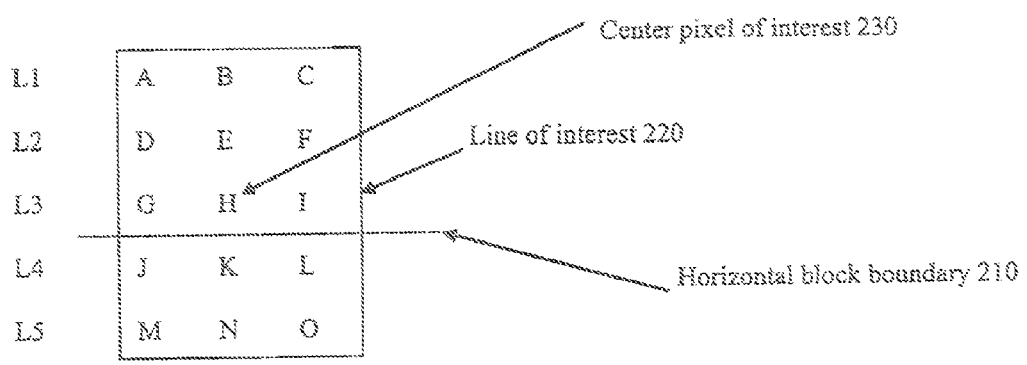
FIG. 2 is an illustrative diagram showing a horizontal block boundary located within five partial lines of video in accordance with one aspect of the invention.

Horizontal block boundary filter 120 receives information about how far the line of interest M is from a horizontal block boundary from horizontal block boundary position detector 110. FIG. 2 illustrates an example of a horizontal block boundary 210 that may be detected in one of the lines above or below a line of interest. Portions of five lines, L1, L2, L3, L4, and L5 are illustrated. If L3 is the line of interest 220 (i.e., M), L1 and L2 are above the line of interest 220 (L3) and L4 and L5 are below the line of interest 220 (L3). A horizontal block boundary (indicated by dotted line 210) is located in between lines L3 and L4. Since the horizontal block boundary 210 exists one line below the line of interest 220 (L3) the horizontal block boundary 210 is said to be at a position of +1 with respect to the line of interest 220 (L3). Instead, if the horizontal block boundary 210 was, for example, in between lines L2 and L3 then it would be said that the horizontal block boundary 210 is at a position of −1 with respect to the line of interest 220 (L3).

Horizontal block boundary position detector 110 (FIG. 1) is used to detect the position of a horizontal block boundary with respect to the line of interest M. In accordance with one embodiment, in order to detect whether or not a horizontal block boundary exists at a position of +1, the values of the center column of pixels (i.e., pixels B, E, H, K, N) are considered. A determination may then be made by calculating whether the regions on either side of the block boundary are relatively flat (e.g., having relatively little variation between pixel intensities) and then calculating whether there is sufficient deviation across these flat regions at the block boundary. If these conditions are met the horizontal block boundary is said to be detected. For example, in order to detect a horizontal block boundary at position +1 within the kernel of pixels illustrated in FIG. 2, the following conditions should be satisfied:

$|B-E|$ & $|E-H|<\text{th\_flat}$ (EQ. 1)

$|K-N|<\text{th\_flat}$ (EQ. 2)

$|(B+E+H)/3-(K+N)/2|>\text{th\_edge\_min}$ (EQ. 3a)

$|(B+E+H)/3-(K+N)/2|<\text{th\_edge\_max}$ (EQ. 3b)

where th_flat is a threshold value for determining that a particular region is flat and where th_edge_min is a threshold value for determining that there is an edge across the horizontal block boundary. The threshold th_edge_max preferably prevents the false detection of true image edges as block boundaries.

If all four of the above mentioned conditions are true then it may be said that a horizontal block boundary exists in the middle column at position +1.

This may be expressed logically as:

$\text{mid\_hbb\_}p1 = (\text{EQ. 1 AND EQ. 2 AND EQ. 3a AND EQ. 3b})$ (EQ. 4).

In some embodiments, this technique for determining the existence of a horizontal block boundary may be made more robust by performing a similar analysis based on the pixels in left column (i.e., pixels A, D, G, J, M) and the pixels in right column (i.e., pixels C, F, I, L, O), thereby computing values for left_hbb_p1 and right_hbb_p1 using EQS. 1-4 by substituting the values of the left column and right column pixels respectively. These equations may be expressed as:

$|A-D|$ & $|D-G|<\text{th\_flat}$ (EQ. 1')

$|J-M|<\text{th\_flat}$ (EQ. 2')

$|(A+D+G)/3-(J+M)/2|>\text{th\_edge\_min}$ (EQ. 3a')

$|(A+D+G)/3-(J+M)/2|<\text{th\_edge\_max}$ (EQ. 3b')

$\text{left\_hbb\_}p1 = (\text{EQ. 1' AND EQ. 2' AND EQ. 3a' AND EQ. 3b'})$ (EQ. 4')

$|C-F|$ & $|F-I|<\text{th\_flat}$ (EQ. 1'')

$|L-O|<\text{th\_flat}$ (EQ. 2'')

$|(C+F+I)/3-(L+O)/2|>\text{th\_edge\_min}$ (EQ. 3a'')

$|(C+F+I)/3-(L+O)/2|<\text{th\_edge\_max}$ (EQ. 3b'')

$\text{right\_hbb\_}p1 = (\text{EQ. 1'' AND EQ. 2'' AND EQ. 3a'' AND EQ. 3b''})$ (EQ. 4'').

These values (i.e., mid_hbb_p1, left_hbb_p1, and right_hbb_p1) may then be used to determine a final value for hbb_p1 which may be computed as:

$$\text{hbb\_}p1=(\text{left\_hbb\_}p1 \text{ AND mid\_hbb\_}p1) \text{ OR} \\ (\text{mid\_hbb\_}p1 \text{ AND right\_hbb\_}p1). \quad \text{(EQ. 5)}$$

Thus, according to EQ. 5 a horizontal block boundary is detected at position +1 when a block boundary is detected at middle and left column or when a block boundary is detected at middle and right column.

While the preceding equations (i.e., EQS. 1-5) all relate to the detection of a horizontal block boundary existing at position +1, values for mid_hbb_m1, left_ hbb_m1, right_hbb_m1, and hbb_m1 may similarly be computed to detect the existence of a horizontal block boundary existing at position −1 based on the same set of pixels from A to O.

After the horizontal block boundary position is determined, the position may be encoded as a 2-bit number. An exemplary encoding scheme is shown in the following table:

| Horizontal block boundary encoding bits | Horizontal block boundary position with respect to center line of interest 220 (L3) |
|---|---|
| 00 | No boundary detected |
| 01 | Horizontal block boundary at position +1 |
| 10 | No boundary detected |
| 11 | Horizontal block boundary detected at position −1 |

Figure 3:
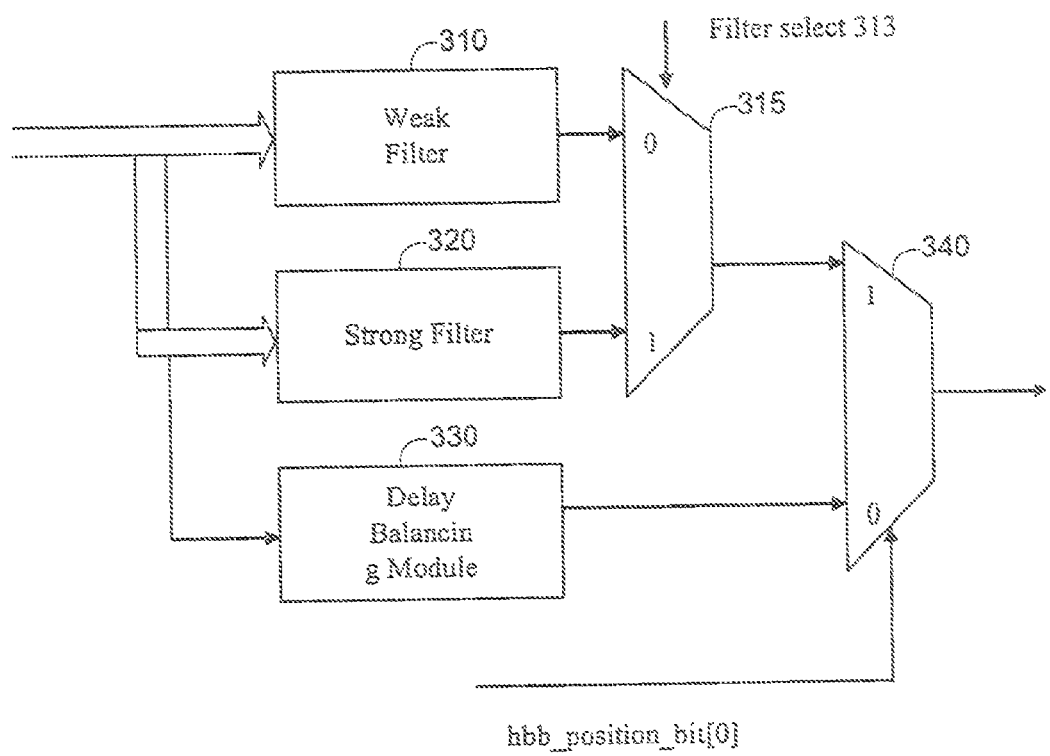
FIG. 3 is an illustrative block diagram of a horizontal block boundary filter in accordance with one aspect of the invention.

Using similar approach it may also be possible to detect horizontal block boundaries at positions of +/−2, +/−3, +/−4, or any other suitable position. However, it should be understood that it may be necessary to buffer additional lines of video in order to increase the number of positions in which horizontal block boundaries may be detected. For example, at least eight lines of video may be needed to detect horizontal block boundaries at positions of +/−3. This information about the presence of a horizontal block boundary and its position with respect to line of interest may then be passed to horizontal block boundary filter 120 (FIG. 1) and overall blocking artifact detector 150 using the encoding scheme shown in the above table or any other suitable encoding scheme:

FIG. 3 shows an illustrative block diagram of horizontal block boundary filter 120. In this embodiment, horizontal block boundary filter 120 contains two types of filters, weak filter 310 and strong filter 320. Either of these filters can be selected using multiplexer 315 by programming a filter select register bit 313. The filters may be selected based on the strength of block edges present in the incoming video. For example, weak filter 310 may be less effective at removing blocking artifacts, but may not introduce too much image blurring. In contrast, strong filter 320 may provide more blocking artifact removal than weak filter 310, but may also cause more image blurring. The two filters are primarily used to filter pixels in the lines that are directly above and below the detected blocking artifacts. The filters receive pixels corresponding to the pixels located above and below the line of interest and output a filtered pixel to replace the pixel of interest. Where there are no detected blocking artifacts, no filtering is necessary. When a pixel is not filtered, the pixel may be delayed by delay balancing module 330 before being sent to the output of horizontal block boundary filter 120 through multiplexer 340.

After the detection of horizontal block boundaries and horizontal block boundary filtering, the filtered pixel data output from horizontal block boundary filter 120 is provided to vertical block boundary filter 140 (FIG. 1). Vertical block boundary filter 140 provides vertical block boundary filtering of the horizontally filtered pixel data based on the detection of the position of vertical block boundaries with respect to center pixel of interest 230 (FIG. 2).

Figure 4:
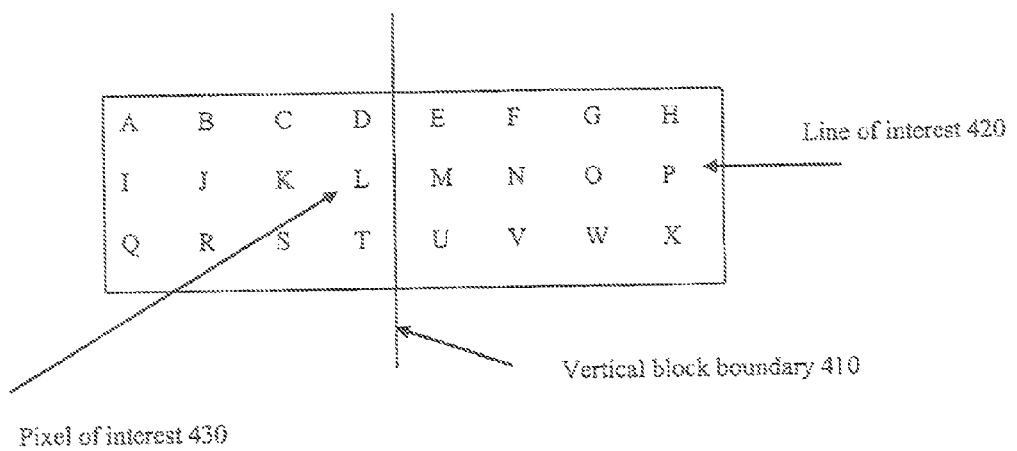
FIG. 4 is an illustrative diagram showing a vertical block boundary located within three partial lines of video in accordance with one aspect of the invention.
Figure 5:
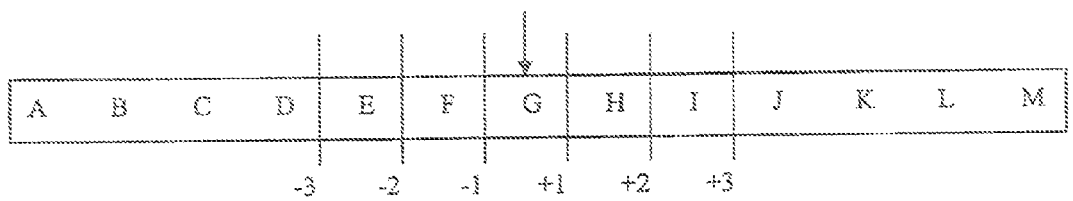
FIG. 5 is an illustrative diagram showing potential vertical block boundary positions with respect to a center pixel of interest in accordance with one aspect of the invention.

FIG. 4 illustrates a diagram showing a potential vertical block boundary 410 located within three partial lines of video. It can be seen that the techniques used to determine the locations of vertical block boundaries and their positions is similar to the techniques used to determine horizontal block boundaries, except that while performing vertical block boundary position detection the direction of processing is horizontal instead of vertical. Because the buffering technique described above stores several complete lines of pixels, working in horizontal direction allows a greater number of pixels to be used during vertical boundary position detection and filtering. In one embodiment, vertical block boundary position detector 130 may detect vertical block boundaries at various positions relative to a central pixel of interest. For example, in order to detect vertical block boundaries at positions of +/−3, +/−2, and +/−1 around 13 pixels of information may be used. FIG. 5 illustrates potential vertical block boundary positions with respect to a central pixel of interest 530 (G).

One exemplary embodiment for detecting a vertical block boundary at position +1 is described below, however it can be seen that with minor variations the same technique may be used to find block boundaries at other position values such as −1, +/−2, +/−3, and beyond. FIG. 4 illustrates a block of pixels used to detect a vertical block boundary 410 at position +1 with respect to central pixel of interest 430 (L). As with the embodiment described above for detecting horizontal block boundaries, first a determination is made as to whether the regions on either side of the potential vertical block boundary 410 are relatively flat and then a determination is made as to whether there is sufficient deviation across these flat regions at vertical block boundary 410. If both of these conditions are met, then a vertical block boundary 410 is detected at the particular position. This detection may be made by computing the following absolute difference values:

$$AD\_1 = |I-J| \quad \text{(EQ. 6)}$$

$$AD\_2 = |J-K| \quad \text{(EQ. 7)}$$

$$AD\_3 = |K-L| \quad \text{(EQ. 8)}$$

$$AD\_4 = |\text{mean}(I,J,K,L) - \text{mean}(M,N,°,P)| \quad \text{(EQ. 9)}$$

$$AD\_5 = |M-N| \quad \text{(EQ. 10)}$$

$$AD\_6 = |N-O| \quad \text{(EQ. 11)}$$

$$AD\_7 = |O-P| \quad \text{(EQ. 12)}.$$

Then using these absolute difference values the flatness of the left region and the right region may be computed as:

$$\text{Left\_region\_flat} = (AD\_1, AD\_2, AD\_3) < \text{th\_flat} \quad \text{(EQ. 13)}$$

$$\text{Right\_region\_flat} = (AD\_5, AD\_6, AD\_7) < \text{th\_flat} \quad \text{(EQ. 14)}$$

where th_flat is a threshold value for determining that a particular region is flat. This value of th_flat may be the same as or different than the value described above with respect to horizontal block boundary position detector 110 (FIG. 1). Then the presence of a sufficient difference across the left and right regions at the vertical block boundary 410 may be computed as:

$$\text{Edge\_detected} = (\text{th\_edge\_min} < AD\_4 < \text{th\_edge\_max}) \quad \text{(EQ. 15)}$$

where th_edge_min is a threshold value for determining that there is an edge across the potential vertical block boundary 410. The threshold th_edge_max preferably prevents the false detection of true image edges as block boundaries. The value of th_edge_min and th_edge_max may be the same or different than the value described above with respect to horizontal block boundary position detector 110 (FIG. 1). Finally, the detection of the potential vertical block boundary 410 in the line of interest 420 may be computed as:

$$\text{VBE\_mid} = \text{left\_region\_flat} \ \& \ \text{edge\_detected} \ \& \ \text{right\_region\_flat} \quad (\text{EQ. 16}).$$

Similarly VBE_top and VBE_bot may be calculated for the lines above and below the line of interest by using EQS. 6-16 using the pixels above and below the line of interest respectively:

$$AD\_1' = |A-B| \quad (\text{EQ. 6'})$$

$$AD\_2' = |B-C| \quad (\text{EQ. 7'})$$

$$AD\_3' = |C-D| \quad (\text{EQ. 8'})$$

$$AD\_4' = |\text{mean}(A,B,C,D) - \text{mean}(E,F,G,H)| \quad (\text{EQ. 9'})$$

$$AD\_5' = |E-F| \quad (\text{EQ. 10'})$$

$$AD\_6' = |F-G| \quad (\text{EQ. 11'})$$

$$AD\_7' = |G-H| \quad (\text{EQ. 12'})$$

$$\text{Left\_region\_flat}' = = (AD\_1', AD\_2', AD\_3') < \text{th\_flat} \quad (\text{EQ. 13'})$$

$$\text{Right\_region\_flat}' = = (AD\_5', AD\_6', AD\_7') < \text{th\_flat} \quad (\text{EQ. 14'})$$

$$\text{Edge\_detected}' = = (\text{th\_edge\_min} < AD\_4' < \text{th\_edge\_max}) \quad (\text{EQ. 15'})$$

$$\text{VBE\_top} = \text{left\_region\_flat}' \ \& \ \text{edge\_detected}' \ \& \ \text{right\_region\_flat}' \quad (\text{EQ. 16'})$$

$$AD\_1'' = |Q-R| \quad (\text{EQ. 6''})$$

$$AD\_2'' = |R-S| \quad (\text{EQ. 7''})$$

$$AD\_3'' = |S-T| \quad (\text{EQ. 8''})$$

$$AD\_4'' = |\text{mean}(Q,R,S,T) - \text{mean}(U,V,W,X)| \quad (\text{EQ. 9''})$$

$$AD\_5'' = |U-V| \quad (\text{EQ. 10''})$$

$$AD\_6'' = |V-W| \quad (\text{EQ. 11''})$$

$$AD\_7'' = |W-X| \quad (\text{EQ. 12''})$$

$$\text{Left\_region\_flat}'' = = (AD\_1'', AD\_2'', AD\_3'') < \text{th\_flat} \quad (\text{EQ. 13''})$$

$$\text{Right\_region\_flat}'' = = (AD\_5'', AD\_6'', AD\_7'') < \text{th\_flat} \quad (\text{EQ. 14''})$$

$$\text{Edge\_detected}'' = = (\text{th\_edge\_min} < AD\_4'' < \text{th\_edge\_max}) \quad (\text{EQ. 15''})$$

$$\text{VBE\_bot} = \text{left\_region\_flat}'' \ \& \ \text{edge\_detected}'' \ \& \ \text{right\_region\_flat}'' \quad (\text{EQ. 16''}).$$

The presence of a vertical block boundary 410 at position +1 may then be computed as:

$$\text{Vbb\_p1} = = (\text{VBE\_top} \ \& \ \text{VBE\_mid}) | (\text{VBE\_mid} \ \& \ \text{VBE\_bot}) \quad (\text{EQ. 17}).$$

In an alternative embodiment, instead of computing Vbb_p1 for each pixel, Vbb_p1, Vbb_p2, and Vbb_p3 (i.e. vertical block boundary at positions +1, +2, and +3) may be computed for a single pixel and then vertical block boundary detection may be skipped for the following two pixels. Using this embodiment or suitable variations thereof, hardware costs may be reduced by reducing the number of pixel regions that are individually analyzed to detect vertical block boundaries.

Once the vertical block boundary positions are detected they may be binary coded. An exemplary coding scheme is shown in the following table:

| Vertical block boundary position | Encoded bit value |
|---|---|
| −3 | 101 |
| −2 | 110 |
| −1 | 111 |
| 0 | 000 |
| 1 | 001 |
| 2 | 010 |
| 3 | 011 |

Figure 6:
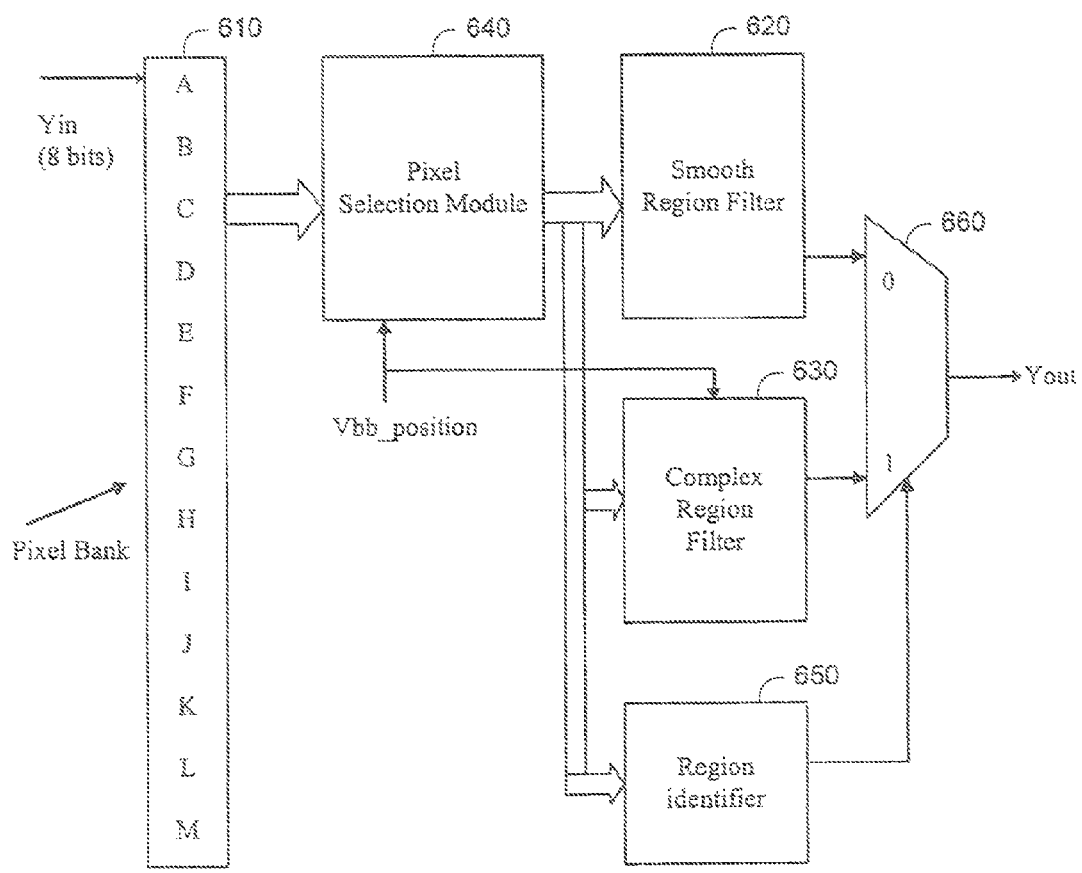
FIG. 6 is an illustrative block diagram of a vertical block boundary filter in accordance with one aspect of the invention.

FIG. 6 shows an illustrative block diagram of vertical block boundary filter 140. As shown in FIG. 1, vertical block boundary filter 140 receives the horizontal block boundary filtered output of horizontal block boundary filter 120. This input is stored in pixel bank 610, which in the illustrated embodiment stores thirteen pixels from the currently processed line of video.

Pixel selection module 640 receives pixel data from pixel bank 610. Pixel selection module 640 may then determine which of the pixels stored in pixel bank 610 will be used in the vertical block boundary filtering. This determination is based on the vertical block boundary position. An exemplary pixel selection scheme, based on the pixels shown in FIG. 5 is illustrated in the table below:

| Vertical block boundary position @ | Pixels used for performing filtering | | |
|---|---|---|---|
| −3 | [C, D, E, F] | [G] | [H, I] |
| −2 | [C, D, E, F] | [G] | [H, I, J] |
| −1 | [C, D, E, F] | [G] | [H, I, J, K] |
| +1 | [C, D, E, F] | [G] | [H, I, J, K] |
| +2 | [D, E, F] | [G] | [H, I, J, K] |
| +3 | [E, F] | [G] | [H, I, J, K] |

From this table it can be seen that the filtering may be skewed depending on the location of the vertical block boundary. Thus, if the block boundary is at the +3 position then only two pixels on the left of pixel of interest 530 (G) and four pixels on the right of pixel of interest 530 (G) are selected for filtering. This kind of skewed filtering is very effective for the pixels which are in the middle of 8×8 blocks. These pixels are generally not disturbed much, meaning if the block boundary is towards right of pixel of interest 530 (G) information from that side is more heavily represented, thereby reducing excess blurring of the image. However, it should be understood that other pixel selection techniques may also be used. In other embodiments all of the received pixels may be used in the vertical block boundary filtering.

Like horizontal block boundary filter 120, vertical block boundary filter 140 contains two filters, a smooth region filter 620 and a complex region filter 630. For example, smooth region filter 620 may be a nine-tap finite input response (FIR) filter while complex region filter 630 may be a more advanced four-point DCT filter. As mentioned earlier, filtering takes place on pixels which are near the block boundaries. When the block boundary is not detected the filters may be bypassed by passing pixel of interest 530 (G) to the output of vertical block boundary filter 140 after performing delay balancing. A delay balancing module is not shown in FIG. 6 but can be considered to be similar to the delay balancing module shown in FIG. 3 (330).

Region identifier 650 may determine which of the two filters should be used to filter a particular group of pixels. Smooth regions may be classified as regions where both sides of the vertical block boundary do not have much variation in pixel values. In these regions the only significant variation in pixel values occur at the vertical block boundary. In contrast, regions where either side of the vertical block boundary is not smooth may be classified as complex regions. Processing complex regions with smooth region filter 620 may result in undesirable smoothening of image details. Instead complex region filter 630 may be used on those pixels in a complex region that are located adjacent to the block boundaries to minimize this undesirable smoothing. Thus, complex region filter 630 may operate on fewer pixels than smooth region filter 620.

Before performing blocking artifact noise reduction, overall blocking artifact detector 150 may be used to detect whether or not the incoming video data has a particular quantity of blocking artifacts. For example, the blocking artifact filters may be turned on only when the incoming video data has a particular quantity of blocking artifacts. However, on cleaner video the blocking artifact blocking filters may be turned off or bypassed.

Figure 7:
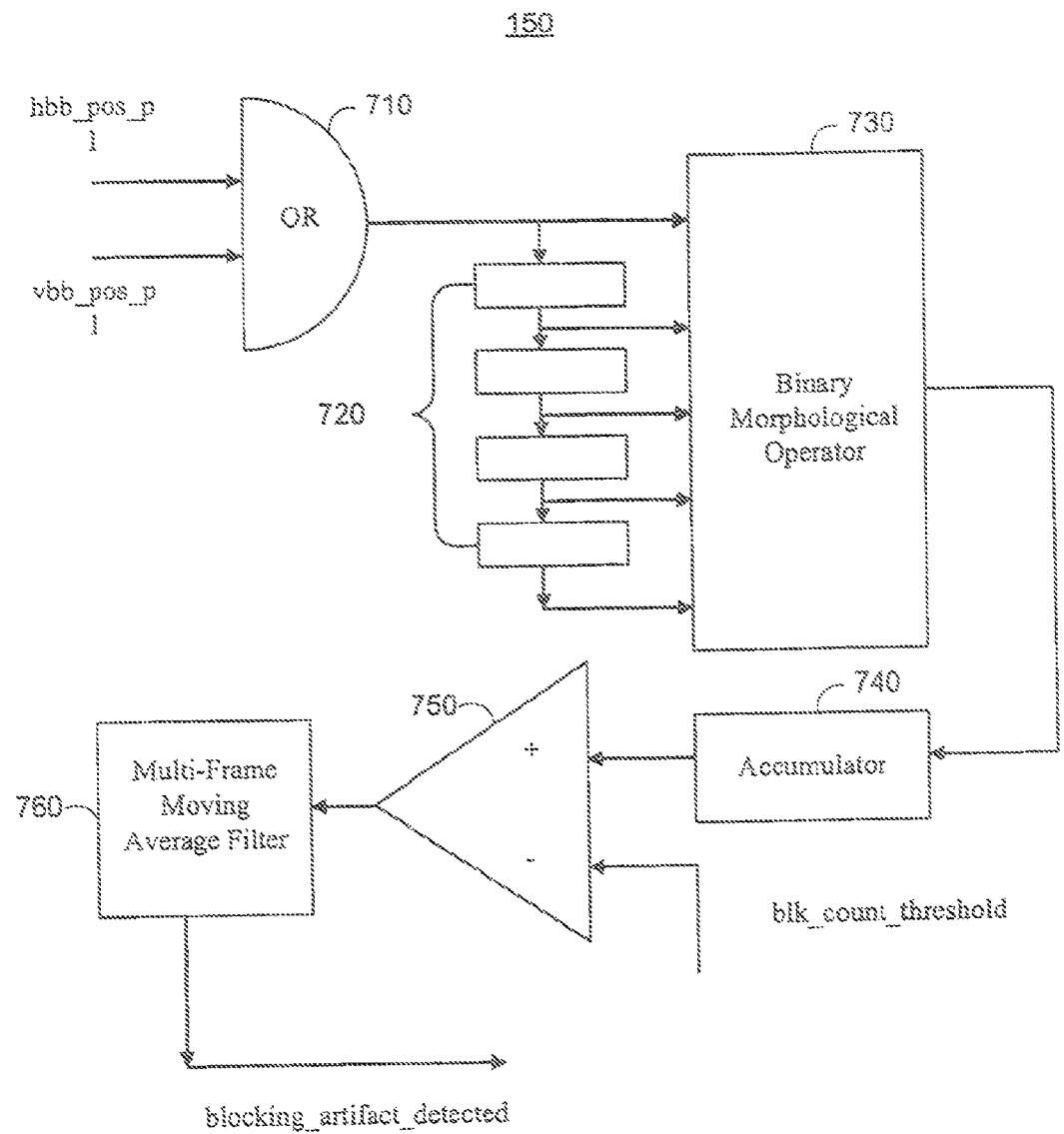
FIG. 7 is an illustrative block diagram of an overall blocking artifact detector in accordance with one aspect of the invention.

FIG. 7 shows an illustrative block diagram of blocking artifact detector 150. Blocking artifact detector 150 receives signals hbb_position and vbb_position from horizontal block boundary detector 110 and vertical block boundary detector 130, respectively. These signals contain information that is indicative of the position of the detected block boundaries. In particular, signals hbb_pos_p1 and vbb_pos_p1 may be derived from hbb_position and vbb_position signals. These two signals are then applied to OR gate 710 whose output signals are stored in buffers 720 which are then fed to binary morphological operator (BMO) block 730.

In some embodiments, buffers 720 may only need to store a single bit of data for each pixel. Thus, because BMO block 730 operates on 5 lines of information, 4 line buffers 720 1920 words wide (in the case of high-definition video) by 1 bit deep may be used. These line buffers 720 may be optimized by packing 4 bits together when writing the data into the memory and unpacking the data after reading the data from the memory. In this arrangement, one clock may be used to perform the read operations and another clock may be used to perform the write operation. When the read and write operations are performed in same clock cycle, two nibbles (4 bits) are packed, stored, retrieved and unpacked at the same time. This leads to reduction in number of words used in buffers 720 by half and increases the data width by 2. In this arrangement the 1920 word by 1 bit buffers 720 may be replaced by buffers 720 that are 960 words by 8 bits. However, because 1024 is the nearest logical power of 2, a memory of size 1024 words by 8 bits may also be used. It should be understood that any other suitable arrangement of buffers 720 may also be used.

BMO block 730 detects the blocking boundary corners based on the stored outputs of OR gate 710. BMO block 730 may detect block boundary corners wherever block boundaries are detected above or below as well as to the left or the right of the pixel of interest. Then, accumulator 740 sums up the total number of detected block boundary corners over the entire frame of video, which may then be compared with a threshold to determine whether a sufficient number of blocking artifacts are present within the frame. The threshold may be set to a fixed number or may be configurable in order to adjust the sensitivity of overall blocking artifact detector 150.

Multi-frame moving average filter 760 receives the output of comparator 750 and averages the output over multiple frames. The output of multi-frame moving average filter 760 is then used to determine whether or not the video is corrupted with blocking artifacts. This output signal (blocking_artifact_detected) may then be provided to multiplexer 160 (FIG. 1) to select whether or not the video data should be filtered before it is passed to the output of blocking artifact detection and removal system 100.

Figure 8:
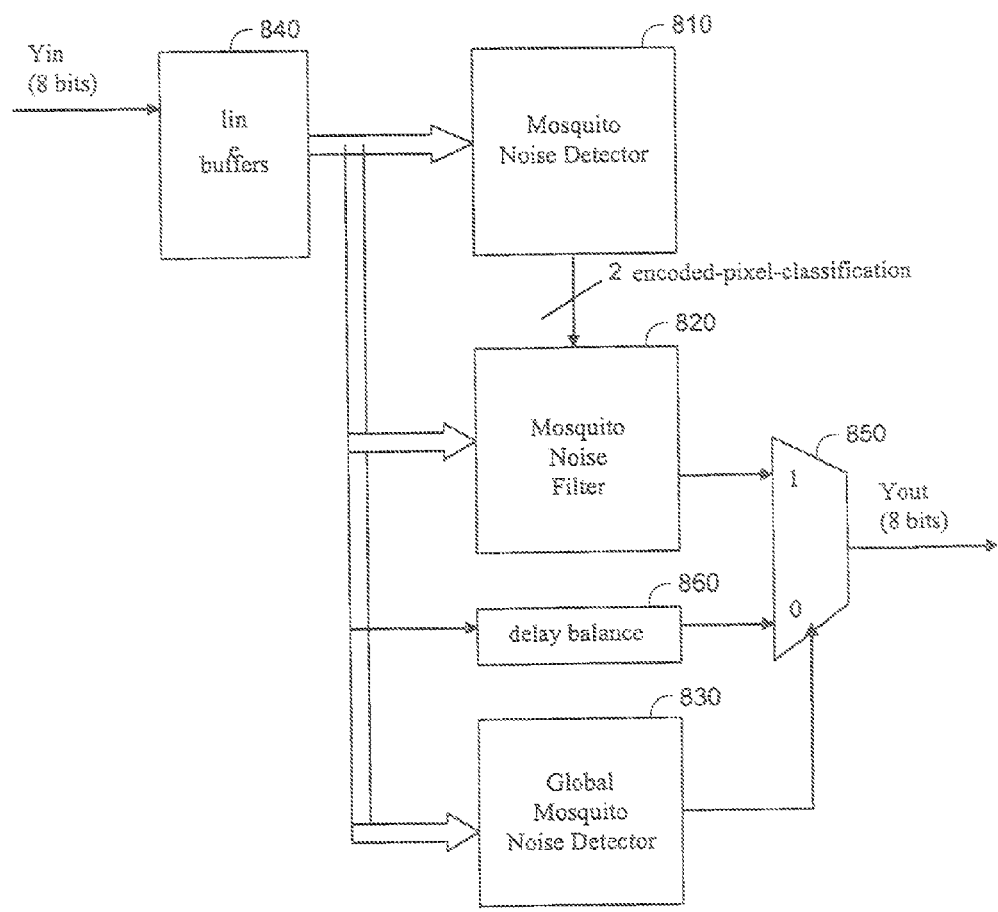
FIG. 8 is an illustrative block diagram of a mosquito noise detection and removal system in accordance with one aspect of the invention.

FIG. 8 shows an illustrative block diagram of mosquito noise detection and reduction system 800. As described above, mosquito noise is a type of edge ringing artifact. Mosquito noise detection and reduction system 800 contains a number of sub-blocks. Mosquito noise detector 810 detects the presence and location of pixels belonging to mosquito noise regions. Mosquito noise filter 820 filters the pixels that belong to the detected mosquito noise regions. Global mosquito noise detector 830 detects the presence of mosquito noise within one or more frames of an incoming video signal in order to activate or de-activate mosquito noise detector 810 and mosquito noise filter 820. Multiplexer 850 which receives the output of global mosquito noise detector 830 may be used to select whether or not the incoming video signal should be filtered for mosquito noise or whether the incoming video signal should be delay balanced and provided to the output mosquito noise detection and reduction system 800 thereby bypassing the filtering. Mosquito noise detection and reduction system 800 also contains line buffers 840. In the present embodiment, line buffers 840 contain four line buffers and outputs five lines of video. For example, this storage may be performed using an on-chip single-port SRAM of size, 1024 words by 96 bits. However, any suitable buffering technique may also be used to store multiple lines of video.

In the present embodiment, mosquito noise detector 810 detects mosquito noise in the pixels received from line buffers 840 using a graded edge map computation technique. A graded edge map is computed on a per pixel basis using a sliding window of size five lines by five pixels. FIG. 9 illustrates a 5×5 array of pixels that may be used to compute a graded edge map. As an example, a graded edge map for a pixel corresponding to center pixel of interest X(3,3) will be computed. Here the first step is to compute mean value of all 25 pixels in the 5×5 pixel array. This mean value may be calculated as follows:

$$\mu = \frac{1}{25} \cdot \sum_{m=1}^{5} \sum_{n=1}^{5} X(m, n). \quad \text{(EQ. 17)}$$

Having computed the mean value of the 25 pixels, the mean absolute deviation (MAD) may be calculated as follows:

$$MAD = \frac{1}{25} \cdot \sum_{i=1}^{5} \sum_{j=1}^{5} |X(i, j) - \mu|. \quad \text{(EQ. 18)}$$

The computed MAD value may then be compared with three threshold values {th_low, th_mid and th_high} to determine a graded edge map of the 5×5 pixel region. These thresholds th_low, th_mid and th_high may be preset or alternatively may be configurable. Typical values of thresholds may be, for example, th_low=2, th_mid=4 and th_high=8.

After comparing the MAD value with the three threshold values, the results may be quantized as a two-bit binary number that describes the activity within the 5×5 region surrounding a center pixel. An exemplary encoding technique and the significance of each of the two-bit binary number is described in the following table:

| Region | Graded Edge Map | Pixel Classification |
|---|---|---|
| 0 | 00 | Smooth region. Signifying low image details or flat regions. |
| 1 | 01 | Smooth but low level of details. Mosquito noise visible and significant due to being present in smooth region. |
| 2 | 10 | Medium detail region (mostly closer to true image edges). Mosquito noise visible but gets slightly masked because of the area being closer to true image edges. |
| 3 | 11 | High detail regions or true image edges. (No mosquito noise seen, completely masked by true image edges). |

Processing pixels belonging to "region 0" or "region 3" by any kind of filter (low pass or median) will likely result in undesirable image blurring, hence these pixels will generally not be filtered at all. Pixels belonging to "region 1" and "region 2" will typically be filtered to remove the mosquito noise. Further, a filter encompassing a larger area (kernel of 5 lines by 5 pixels) may be used for "region 1," while a smaller filter (kernel of 3 lines by 3 pixels) is used for "region 2." The reason for a smaller filter to be used for "region 2" is that the pixels in this region are closer to true image edges and therefore using a large kernel would lead to blurring of image edges. Any suitable filters may be used to remove the mosquito noise from regions including significant amounts of mosquito noise. However, in the present embodiment one or more edge-adaptive low-pass filters may be used, as this type of filter is effective at reducing mosquito noise as well as retaining a good amount of image details.

Figure 10:
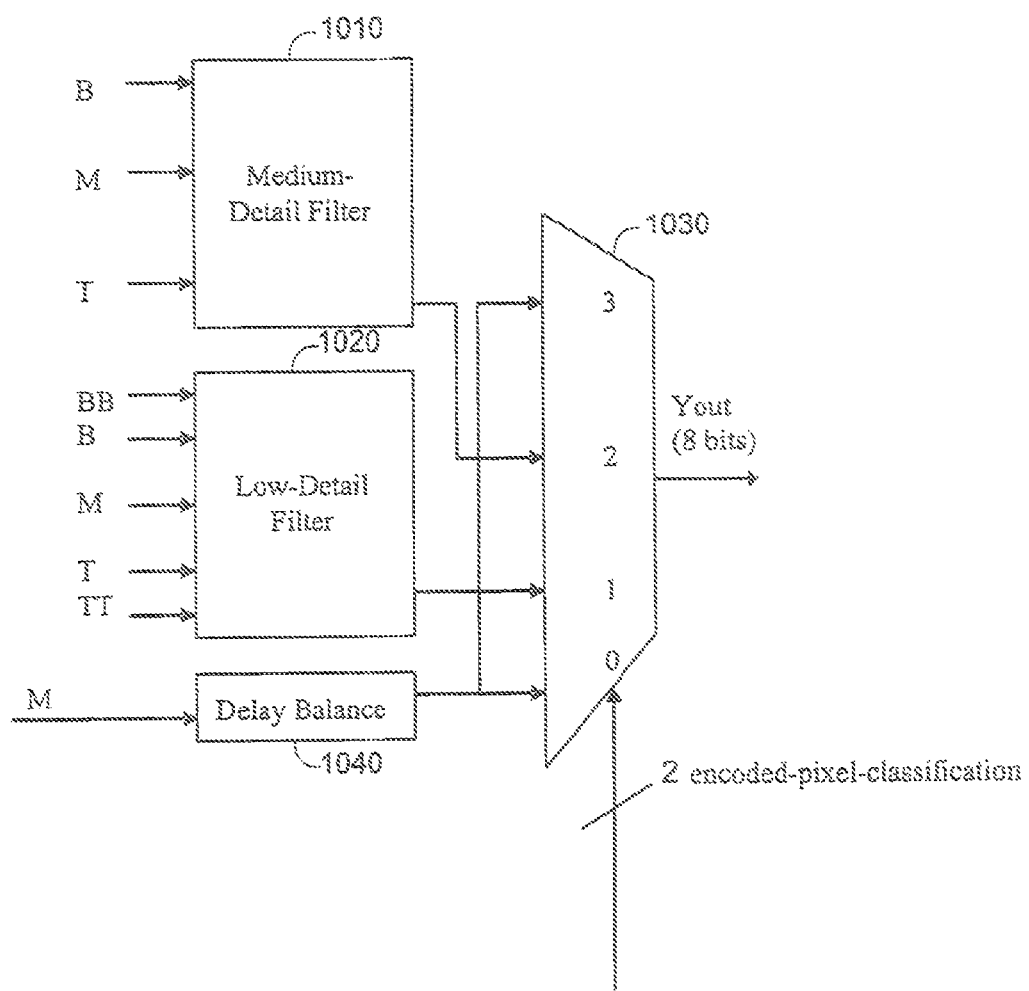
FIG. 10 is an illustrative block diagram of a mosquito noise reduction filter in accordance with one aspect of the invention.

FIG. 10 illustrates an exemplary block diagram of a mosquito noise filter 820. Mosquito noise filter 820 includes medium-detail filter 1010 and low-detail filter 1020. For example, medium-detail filter 1010 may be a 3×3 edge-adaptive low-pass filter and low-detail filter 1020 may be a 5×5 edge-adaptive low-pass filter. The basic operation of a typical edge-adaptive low-pass may be described with reference to the 3×3 block of pixels illustrated in FIG. 11.

Figure 11:
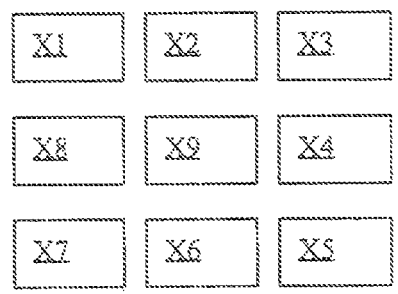
FIG. 11 is an illustrative diagram showing a 3×3 array of pixels that may be used in a 3×3 edge-adaptive low-pass filer in accordance with one aspect of the invention.

FIG. 11 illustrates the pixels that may be used by a 3×3 edge-adaptive low-pass filter to generate an output pixel whose position corresponds to the center pixel X9 of the 3×3 kernel. The filtered output pixel may be called Y9. Output pixel Y9 may replace input pixel X9 in the filtered signal output. The equation for output pixel Y9 may be expressed as:

$$Y9 = X9 + (1/8) * \sum_{i=1}^{i=8} \text{Zeta}(Xi, X9) \quad \text{(EQ. 19)}$$

where the function "Zeta" is defined as, where Th is a preset or configurable threshold value:

$$\text{Zeta}(U, V) = \begin{cases} U - V & |U - V| > Th \\ \{(3*Th - |U - V|)/2\}\text{sign}(U - V) & Th < |U - V| \le 3*Th \\ 0 & |U - V| > 3*Th \end{cases} \quad \text{(EQ. 20)}$$

From EQS. 19 and 20 it can be seen that when there is too much deviation between a neighboring pixel and the center pixel (e.g., greater than three times threshold value "Th"), the neighboring pixel is quite different than the center pixel and probably belongs to an edge. When this deviation is large, this neighboring pixel should not be used for the computation of the output pixel. If this neighboring pixel were to be considered the image would lose some amount of high frequency details and look blurred. However, when there is not too much deviation between the neighboring pixel and the center pixel, the neighboring pixel may be used to generate the filtered output pixel. In the present embodiment, where the difference between the neighboring pixel and the center pixel is greater than the threshold value, but less than three times the threshold value, the neighboring pixel may be used to calculate the output pixel, but may be given less weight than other neighboring pixels having a smaller difference.

It is important to perform overall mosquito noise region detection before attempting to remove the mosquito noise from an incoming video signal. Even in clean video that does not have significant amounts of mosquito noise, some areas with small and medium amount of details may be wrongly detected as mosquito noise. In such cases, applying mosquito noise filtering to the detected areas may lead to image blurring. One technique for performing this overall mosquito noise detection (globally on frame basis) is illustrated with reference to the diagrams illustrated in FIG. 12 and FIG. 13.

FIG. 12 contains three adjacent 4×4 blocks of pixels: left block 1210, middle block 1220, and right block 1230. The level of detail in each 4×4 block may be measured by computing mean absolute deviation (MAD) of each 4×4 block. A general technique for computing the MAD is given by EQS. 17 and 18. Here, however the MAD will be calculated for a 4×4 block of pixels instead of a 5×5 block of pixels. The computed MAD values may then be compared with one or more threshold values in order to classify the blocks into a number of categories such as: flat regions, regions with medium amount of details, and regions with high levels of details. Typically, mosquito noise is present where the left block 1210 has low details (i.e., a flat region), the middle block 1220 has medium details, and the right block 1230 has high detail. The reverse is also true, meaning the left block 1210 having high detail, the middle block 1220 having medium details, and the right block 1230 being flat. It has also been seen that mosquito noise is more apparent when an image edge has a diagonal orientation. This occurs because during signal compression more diagonal features get disturbed as compared to horizontal and vertical details. Each of these criteria may be used to detect whether or not the middle block 1220 belongs to mosquito noise region.

In order to determine the amount of mosquito noise in an entire frame of video, the selected pixels are shifted over by 4 pixels in a raster scan order for the entire frame of video. By sliding the pixels over by subsequent 4×4 blocks of pixels for the entire frame of video, the total number of such mosquito noise blocks in a frame of video may be counted and compared with a particular threshold. If the count happens to be greater than the threshold, it means that mosquito noise is present in the incoming frame of video.

The following is a more detailed description of illustrative steps for determining whether or not a 4×4 block of pixels contains mosquito noise. First, the MAD values for the left block 1210, the middle block 1220, and the right block 1230 are computed. The computed MAD values for each of the three 4×4 block of pixels may be called mad_left, mad_mid, and mad_right. Then, it is determined whether or not the left block of pixels should be classified as a flat area or a detailed area by comparing mad_left with thresholds values such as th_flat and th_edge. Similarly, the right block 1230 may be classified as flat or detailed using the same technique. Then, if it is determined that the left block 1210 is a detailed area, it is also determined whether there are any vertical edges present in the left block 1210.

Figure 13:
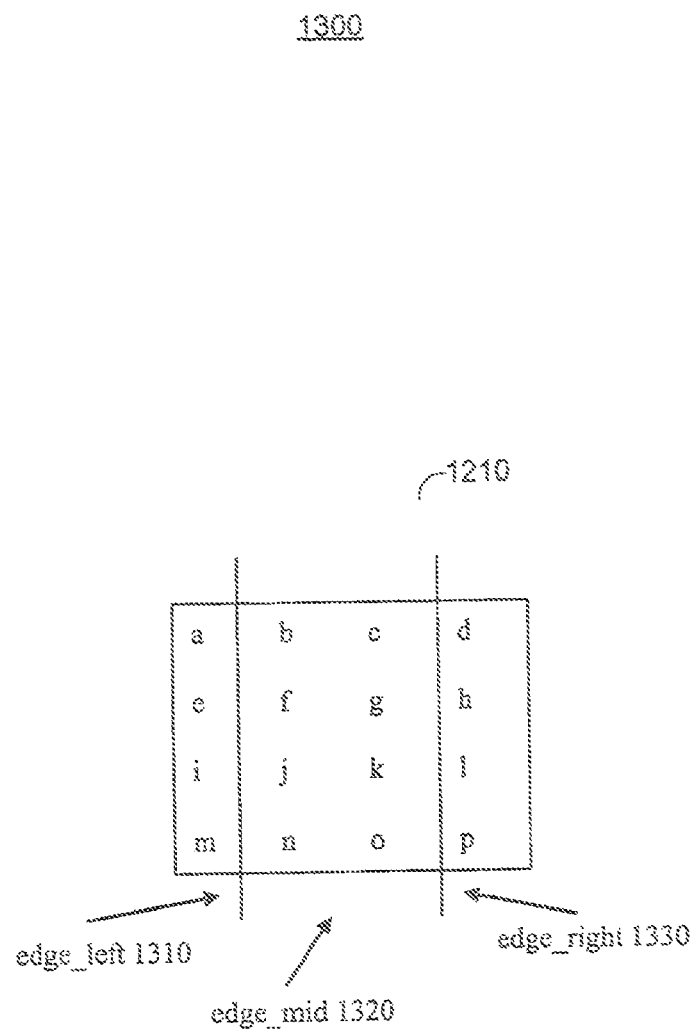
FIG. 13 is an illustrative diagram showing the potential locations of vertical edges within a 4×4 block of pixels in accordance with one aspect of the invention.

FIG. 13 illustrates a 4×4 block of pixels that indicates the potential locations of vertical edges within the block of pixels. For example the presence of flat_left and edge_left may be calculated as follows:

$$\text{flat} = (|a-e| < \text{th\_col\_flat}) \& (|e-i| < \text{th\_col\_flat}) \& (|i-m| < \text{th\_col\_flat}) \quad (\text{EQ. 21})$$

$$\text{edge\_left} = \left| \frac{a+e+i+m}{4} - \frac{b+f+j+n}{4} \right| > \text{th\_col\_edge} \quad (\text{EQ. 22})$$

where th_col_flat is a threshold for determining whether a column is flat and th_col_edge is a threshold for determining that an edge exists across two or more columns. Vertical edges edge_mid and edge_right may be calculated using a similar technique:

$$\text{edge\_mid} = \left| \frac{b+f+j+n}{4} - \frac{c+g+k+o}{4} \right| > \text{th\_col\_edge} \quad (\text{EQ. 22}')$$

$$\text{edge\_right} = \left| \frac{c+g+k+o}{4} - \frac{d+h+l+p}{4} \right| > \text{th\_col\_edge}. \quad (\text{EQ. 22}'')$$

Finally, it is determined that the left block 1210 has a vertical edge when:

$$v\_\text{edge\_left} = = (\text{edge\_left OR edge\_mid OR edge\_right}) \quad (\text{EQ. 23}).$$

Similarly, v_edge_right may also be calculated by determining whether or not the right block 1230 (FIG. 12) has at least one vertical edge using EQS. 21-23 for the pixels in the right block 1230.

Returning to FIG. 12, a determination may then be made as to whether or not the middle block 1220 has a medium amount of details. To make this determination, first the middle block 1220 is classified as a dark area or a bright area, because small variations in a dark area are more visible than the same amount variations in a bright area. The mean value of all pixels within the middle block 1220 may be calculated as:

$$\text{mean\_mid} = \frac{1}{N} \cdot \sum_{1}^{N} X_i \quad (\text{EQ. 24})$$

where N is 16, the numbers of pixels in the 4×4 block of pixels. The threshold for determining that the middle block 1220 should be classified as having low details, th_mid_low, may then be set based on the computed mean value, mean_mid. For example, if mean_mid is greater than 100, th_mid_low may be set to 6. Otherwise, th_mid_low may be set to 3. Finally, the middle block 1220 is determined to have a medium amount of details when:

$$\text{qual\_mid} = (\text{th\_mid\_low} < \text{mad\_mid} < \text{th\_mid\_high}) \quad (\text{EQ. 25}).$$

After the level of details is determined for the left block 1210, the middle block 1220, and the right block 1230, qual_rise and qual_fall may be calculated. When the left block 1210 is flat, the middle block 1220 has a medium amount of details, and the right block 1230 has high amount of detail, qual_rise is true unless right block 1230 has any vertical edges. Similarly, when the left block 1210 has high details, the middle block 1220 has a medium amount of details, and the right block 130 is flat, qual_fall is true unless the left block 1210 has any vertical edges. Thus, qual_rise and qual_fall may be calculated as:

$$\text{qual\_rise} = (\text{flat\_left}) \& (\text{qual\_mid}) \& (\text{det\_right}) \& (\overline{\text{v\_edge\_right}}) \quad (\text{EQ. 26})$$

$$\text{qual\_fall} = (\overline{\text{v\_edge\_left}}) \& (\text{det\_left}) \& (\text{qual\_mid}) \& (\text{flat\_right}) \quad (\text{EQ. 27})$$

where det_left and det_right are calculated based on the activity of the left and right blocks, respectively. For example, these values are true whenever the computed MAD values of the left and right blocks are greater than a threshold value. In this situation, when the computed MAD values are greater than this threshold value, it is determined that these blocks are not flat and have some level of detail.

The middle block 1220 may then be determined to have mosquito noise when:

$$\text{mosq\_noise\_det\_flag} = (\text{qual\_rise} \| \text{qual\_fall}) \quad (\text{EQ. 28}).$$

The total of all blocks determined to have mosquito noise in a single frame of video may then be calculated and if this value is greater than a threshold value, the frame is determined to have mosquito noise. A flag signal may be generated in such case, which may remain high for the entire duration of one frame. In order to avoid frequent detection and non-detection of mosquito noise, the detected signal may be passed through, for example, a programmable 8 or 16 or 32 frame moving average filter which averages this determination over several frames. The generated flag signal may then be used to activate and deactivate the filtering of mosquito noise.

Accordingly, what has been described is a system and method for an adaptive noise reducer. In one aspect of the invention, blocking artifacts in an MPEG video signal may be reduced. In another aspect of the invention, mosquito noise in an MPEG video signal may be reduced.

Accordingly, what have been described are a system and method for adaptive MPEG noise reduction. Throughout the specification and claims, the following terms take at least the meanings explicitly associated herein, unless the context clearly dictates otherwise. The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one of current, voltage, charge, temperature, data, or other signal.

What is claimed is:

1. A method for detecting and reducing noise in a digital video signal, the method comprising:
   locating a region within the digital video signal affected by mosquito noise;
   filtering the located region within the digital video signal;
   determining whether there is a predetermined amount of mosquito noise in at least one frame of the digital video signal by determining an amount of mosquito noise in the at least one frame of the digital video signal, and comparing the determined amount of mosquito noise to the predetermined amount of mosquito noise; and
   selectively providing the filtered digital video signal or the digital video signal based on the determining.

2. The method of claim 1 wherein determining whether there is a predetermined amount of mosquito noise comprises determining whether there are a predetermined number of mosquito noise regions within the at least one frame of video.

3. The method of claim 2 wherein determining whether there are a predetermined number mosquito noise regions comprises determining corresponding regional complexities of a first region of pixels and two adjacent regions of pixels and comparing the determined regional complexities of the three regions of pixels.

4. The method of claim 1 wherein locating a region within the digital video signal affected by mosquito noise comprises determining a complexity of the region.

5. The method of claim 4 wherein determining the complexity of the region comprises calculating a graded edge map for the region.

6. The method of claim 5 wherein calculating a graded edge map of the region comprises:
   calculating a mean value of all of the pixels within the region;
   calculating a mean absolute deviation value of all of the pixels within the region; and
   comparing the mean absolute deviation value with at least one threshold value.

7. The method of claim 1 wherein filtering the located region within the digital video signal comprises selecting a filter based on a complexity of the located region.

8. The method of claim 7 wherein selecting a filter based on the complexity of the region comprises selecting one of a low-detail edge-adaptive filter and a medium-detail edge-adaptive filter.

9. A system for detecting and reducing noise in a digital video signal, the system comprising:
   regional mosquito noise detector circuitry for locating a region within the digital video signal affected by mosquito noise;
   mosquito noise filter circuitry for filtering the located region within the digital video signal;
   overall mosquito noise detector circuitry determining whether there is a predetermined amount of mosquito noise in at least one frame of the digital video signal by determining an amount of mosquito noise in the at least one frame of the digital video signal, and comparing the determined amount of mosquito noise to the predetermined amount of mosquito noise; and
   output circuitry for selectively providing the filtered digital video signal or the digital video signal based on the determining.

10. The system of claim 9 wherein the overall mosquito noise detector circuitry comprises circuitry for determining whether there are a predetermined number of mosquito noise regions within the at least one frame of video.

11. The system of claim 10 wherein determining whether there are a predetermined number mosquito noise regions comprises determining corresponding regional complexities of a first region of pixels and two adjacent regions of pixels and comparing the determined regional complexities of the three regions of pixels.

12. The system of claim 9 wherein the regional mosquito noise detector circuitry comprises circuitry for determining a complexity of the region.

13. The system of claim 12 wherein determining the complexity of the region comprises calculating a graded edge map for the region.

14. The system of claim 13 wherein calculating a graded edge map of the region comprises:
   calculating a mean value of all of the pixels within the region;
   calculating a mean absolute deviation value of all of the pixels within the region; and
   comparing the mean absolute deviation value with at least one threshold value.

15. The system of claim 9 wherein the regional mosquito noise detector circuitry comprises filter selection circuitry for selecting a filter based on a complexity of the located region.

16. The system of claim 15 wherein selecting a filter based on the complexity of the region comprises selecting one of a low-detail edge-adaptive filter and a medium-detail edge-adaptive filter.

17. The method of claim 1 wherein selectively providing the filtered digital video signal or the digital video signal based on the determining comprises:
   delay balancing the digital video signal;
   providing the filtered digital video signal when a determination is made that there is the predetermined amount of mosquito noise; and
   providing the delay balanced digital video signal when a determination is made that there is not the predetermined amount of mosquito noise.

18. The method of claim 1 wherein determining whether there is a predetermined amount of mosquito noise in at least one frame of the digital video signal comprises deactivating locating and filtering of a region within the digital video signal affected by mosquito noise when a determination is made that there is not the predetermined amount of mosquito noise.

19. The method of claim 1 wherein determining whether there is a predetermined amount of mosquito noise comprises determining if an average amount of mosquito noise determined over several frames of the digital video signal is greater than a predetermined average amount of mosquito noise over the several frames.

20. The system of claim 9 wherein the output circuitry comprises circuitry for:
   delay balancing the digital video signal;
   providing the filtered digital video signal when a determination is made that there is the predetermined amount of mosquito noise; and
   providing the delay balanced digital video signal when a determination is made that there is not the predetermined amount of mosquito noise.

21. The system of claim 9 wherein the overall mosquito noise detector circuitry comprises circuitry for deactivating the mosquito noise detector circuitry and mosquito noise filter circuitry when a determination is made that there is not the predetermined amount of mosquito noise.

22. The system of claim 9 wherein the overall mosquito noise detector circuitry comprises circuitry for determining if an average amount of mosquito noise determined over several frames of the digital video signal is greater than a predetermined average amount of mosquito noise over the several frames.

23. The method of claim 1, wherein the provided digital video signal is a delayed version of the digital video signal.

24. The method of claim 23, wherein the delayed version of the digital video signal is provided when a determination is made that there is not the predetermined amount of mosquito noise.

25. The system of claim 9, wherein the provided digital video signal is a delayed version of the digital video signal.

26. The system of claim 25, wherein the delayed version of the digital video signal is provided when a determination is made that there is not the predetermined amount of mosquito noise.

* * * * *